(12) United States Patent
Lee et al.

(10) Patent No.: US 10,720,630 B2
(45) Date of Patent: Jul. 21, 2020

(54) SECONDARY BATTERY HAVING IMPROVED OUTPUT CHARACTERISTICS

(71) Applicant: LG CHEM, LTD., Seoul (KR)

(72) Inventors: Hyeok-Moo Lee, Daejeon (KR); Song-Taek Oh, Daejeon (KR)

(73) Assignee: LG Chem, Ltd. (KR)

( * ) Notice: Subject to any disclaimer, the term of this patent is extended or adjusted under 35 U.S.C. 154(b) by 524 days.

(21) Appl. No.: 15/515,307

(22) PCT Filed: Dec. 8, 2015

(86) PCT No.: PCT/KR2015/013379
§ 371 (c)(1),
(2) Date: Mar. 29, 2017

(87) PCT Pub. No.: WO2016/093590
PCT Pub. Date: Jun. 16, 2016

(65) Prior Publication Data
US 2017/0214031 A1    Jul. 27, 2017

(30) Foreign Application Priority Data

Dec. 8, 2014  (KR) .................. 10-2014-0175288
Dec. 8, 2014  (KR) .................. 10-2014-0175296

(51) Int. Cl.
*H01M 2/30* (2006.01)
*H01M 2/02* (2006.01)
(Continued)

(52) U.S. Cl.
CPC .............. *H01M 2/30* (2013.01); *H01M 2/02* (2013.01); *H01M 2/16* (2013.01); *H01M 4/13* (2013.01);
(Continued)

(58) Field of Classification Search
None
See application file for complete search history.

(56) References Cited

U.S. PATENT DOCUMENTS 9,479,000 B2    10/2016  Gu et al.
2014/0291588 A1  10/2014  Oh et al.

FOREIGN PATENT DOCUMENTS

EP    1 014 466 B1    10/2003
JP    2002-110170 A   4/2002
(Continued)

OTHER PUBLICATIONS

KR20080095967 English translation obtained from Google Patents Feb. 3, 2019 (Year: 2008).*

(Continued)

*Primary Examiner* — Sarah A. Slifka
(74) *Attorney, Agent, or Firm* — Lerner, David, Littenberg, Krumholz & Mentlik, LLP (57) ABSTRACT

A secondary battery having improved output characteristics is disclosed. The secondary battery according to the present invention accommodates a cell assembly including a plurality of cells connected in parallel, and an electrolyte together in one package, in which positive electrodes of a plurality of central cells disposed at a central part of the cell assembly have a loading energy density higher than that of positive electrodes of a plurality of side cells disposed at a side part, and the positive electrodes of the central cells have positive electrode material coating layers formed at surfaces thereof, which are thicker than those formed at surfaces of the positive electrodes of the side cells. Preferably, the total resistance of the side cells is lower than the total resistance of the central cells.

12 Claims, 6 Drawing Sheets

(51) Int. Cl.
  *H01M 2/16* (2006.01)
  *H01M 10/04* (2006.01)
  *H01M 4/13* (2010.01)
  *H01M 4/62* (2006.01)
  *H01M 10/058* (2010.01)
  *H01M 10/0525* (2010.01)
  *H01M 10/42* (2006.01)

(52) U.S. Cl.
  CPC ............. *H01M 4/62* (2013.01); *H01M 10/04* (2013.01); *H01M 10/0413* (2013.01); *H01M 10/058* (2013.01); *H01M 10/0525* (2013.01); *H01M 2010/4292* (2013.01); *H01M 2220/20* (2013.01); *Y02E 60/122* (2013.01); *Y02T 10/7011* (2013.01)

(56) References Cited

FOREIGN PATENT DOCUMENTS

| | | |
|---|---|---|
| JP | 2004-31269 A | 1/2004 |
| JP | 2011-108619 A | 6/2011 |
| JP | 2012-186034 A | 9/2012 |
| JP | 2013-191396 A | 9/2013 |
| KR | 10-2000-0047375 A | 7/2000 |
| KR | 10-2008-0023376 A | 3/2008 |
| KR | 10-2008-0095967 A | 10/2008 |
| KR | 20080095967 * | 10/2008 |
| KR | 10-2014-0018542 A | 2/2014 |
| KR | 10-2014-0034340 A | 3/2014 |
| KR | 10-2014-0092554 A | 7/2014 |
| WO | WO 2006/025662 A1 | 3/2006 |

OTHER PUBLICATIONS

International Search Report, issued in PCT/KR2015/013379, dated May 4, 2016.

* cited by examiner

SECONDARY BATTERY HAVING IMPROVED OUTPUT CHARACTERISTICS

TECHNICAL FIELD

The present disclosure relates to a secondary battery, and more particularly, to a secondary battery having improved output characteristics in which heterogeneous cells with different electrical characteristics from each other are connected in parallel and contained in one single package.

The present application claims priority to Korean Patent Application No. 10-2014-0175296 filed on Dec. 8, 2014, and Korean Patent Application No. 10-2014-0175288 filed on Dec. 8, 2014 in the Republic of Korea, the disclosures of which are incorporated herein by reference.

BACKGROUND ART

Lithium secondary battery, with its high operating voltage and energy density and superior output characteristics, is widely used as an energy source for the electronic products or electrically-driven apparatuses.

The lithium secondary battery includes a cell assembly and an electrolyte, and a package that sealingly accommodates the cell assembly and the electrolyte therein and that has an electrode terminal formed thereon.

The cell assembly includes a plurality of unit cells connected in parallel, and each of the unit cells includes at least a positive electrode plate and a negative electrode plate, and a separator interposed therebetween.

The positive electrode plate and the negative electrode plate each includes a positive electrode active material coating layer and a negative electrode active material coating layer where lithium ions can be intercalated or de-intercalated. The lithium metal oxide and graphite are the representative examples that are used as the positive electrode active material and the negative electrode active material.

Traditionally, the lithium secondary battery has been mainly used in a handheld terminal such as mobile phone, laptop computer, video camera, electric tools, and so on.

However, the recent concerns over depletion of petroleum have prompted extended use of the lithium secondary battery to the field of electrically-driven vehicles. The electrically-driven vehicles, or vehicles driven by electrical energy, include electric vehicles (EV), hybrid electric vehicles (HEV), plugin HEV (PHEV), and so on.

In order to be adapted for use in the electrically-driven vehicles, the lithium secondary battery is required to have high outputs and energy density. Only by that way it is possible for the battery to support excellent running performance and also increase the driving distance of the electrically-driven vehicle.

The output from the lithium secondary battery can be enhanced by enhancing the positive electrode active material.

For example, Korean Patent Publication No. 2014-0018542 discloses that use of a blended positive electrode material including a first active material having good outputs in high SOC range, mixed at a particle level with a second active material having good outputs in low SOC range leads into enhanced outputs of the lithium secondary battery.

However, blending active materials at a particle level can deteriorate microstructure of the active material coating layer due to differences in the physical characteristics of the respective active materials.

For example, when the active materials forming a blended positive electrode material have different coefficients of expansion or mechanical strengths from one another, this may cause cracks within particles or even crush the particles during the process of coating the blended positive electrode material on the positive electrode plate.

Further, in order to obtain an effect of increased output by use of the blended positive electrode material, it is necessary to optimize the particle shape or size distribution of each of the active material particles, but the process takes a considerable amount of time and cost.

Meanwhile, Korean Patent Publication No. 2014-0092554 discloses improving an output of a battery pack by constructing mixed cells by connecting in parallel the heterogenous cells with different electric characteristics from each other, and then constructing a battery pack by repeatedly connecting the mixed cells in series.

This mixed cells have a structure in which two independently-packed cells are connected in parallel. In such structure, when one of the cells has a relatively faster degradation, the service life of the battery pack would be shortened rapidly.

Cell degradation can happen mainly due to the loss of lithium ions contained in the electrolyte by the side reaction, or due to the structural decay of the positive electrode active material or the negative electrode active material. However, when two cells are independently packed, it is difficult to have electrochemical reactions between the cells to compensate for the degradation of either one of the cells.

DISCLOSURE

Technical Problem

The present disclosure is designed to solve the problems of the related art, and therefore the present disclosure is directed to providing a secondary battery with improved output characteristics, by arranging different unit cells having positive electrodes with adjusted loading energy density and area specific resistances in optimized positions, connecting these in parallel, and sealing the same together with the electrolyte within one single package.

Technical Solution

In one aspect of the present disclosure, there is provided a secondary battery with improved output characteristics, which accommodates a cell assembly including a plurality of cells connected in parallel, and an electrolyte together in one package, in which positive electrodes of a plurality of central cells disposed at a central part of the cell assembly have a loading energy density higher than that of positive electrodes of a plurality of side cells disposed at a side part, and the positive electrodes of the central cells have positive electrode material coating layers formed at surfaces thereof, which are thicker than those formed at surfaces of the positive electrodes of the side cells.

Preferably, a total resistance of the side cells may be less than a total resistance of the central cells.

Preferably, the positive electrodes of the central cells may have a loading energy density of 3.9-4.1 mAh/cm$^2$, and the positive electrodes of the side cells may have a loading energy density of 1.6-1.8 mAh/cm$^2$.

According to one aspect, the positive electrodes of the central cells and the positive electrodes of the side cells may include positive electrode material coating layers with the same chemical composition.

Preferably, the positive electrodes of the central cells and the positive electrodes of the side cells may include positive electrode material coating layers, respectively, and the chemical compositions and/or average particle diameters of the positive electrode material particles included in each of the positive electrode material coating layers may be substantially identical.

Preferably, the positive electrodes of the central cells and the positive electrodes of the side cells may include positive electrode material coating layers, respectively, and a content of a conductive material included in each of the positive electrode material coating layers may be substantially identical.

Preferably, the central cells may include a positive electrode, a negative electrode, and a first electrode separator with porosity interposed therebetween, and the side cells may include a positive electrode, a negative electrode, and a second electrode separator with porosity interposed therebetween, and the first electrode separator and the second electrode separator may have substantially the same resistance.

According to another aspect, the positive electrodes of the central cells and the positive electrodes of the side cells may include positive electrode material coating layers, respectively, and the chemical compositions and/or average particle diameters of the positive electrode material particles included in each of the positive electrode material coating layers may be difference from each other.

Preferably, the positive electrodes of the central cells may include a first positive electrode material coating layer containing first positive electrode material particles and a conductive material, and the positive electrodes of the side cells may include second positive electrode material coating layer containing second positive electrode material particles and a conductive material, in which the average particle diameter of the first positive electrode material particles may be greater than the average particle diameter of the second positive electrode material particles.

Alternatively, the positive electrodes of the central cells may include a first positive electrode material coating layer containing first positive electrode material particles and a conductive material, and the positive electrodes of the side cells may include a second positive electrode material coating layer containing second positive electrode material particles and a conductive material, in which the second positive electrode material coating layer may contain more conductive material than the first positive electrode material coating layer.

Alternatively, the central cells may include a positive electrode, a negative electrode, and a first separator with porosity interposed therebetween, and the side cells may include a positive electrode, a negative electrode, and a second separator with porosity interposed therebetween, in which the second separator may have a lower resistance than the first separator.

Preferably, the negative electrode of one of the central cells and the positive electrode of one of the side cells may be disposed at a border between the central part and the side part, respectively, and the negative electrode may include a negative electrode plate, and an inner to coating layer and an outer coating layer respectively coated on both surfaces thereof, in which the inner coating layer may be disposed toward a center of the cell assembly and may be thicker than the outer coating layer.

Alternatively, the positive electrode of one of the central cells and the negative electrode of one of the side cells may be disposed at a border between the central part and the side part, respectively, and the positive electrode may include a positive electrode plate, and an inner coating layer and an outer coating layer respectively coated on both surfaces thereof, in which the inner coating layer may be disposed toward a center of the cell assembly and may be thicker than the outer coating layer. Preferably, a number of the side cells may be greater than a number of the central cells.

Preferably, the package that seals the cell assembly together with the electrolyte may be a pouch package.

Advantageous Effects

According to the present disclosure, the secondary battery may have not only the increased energy density per unit volume, but also the reduced resistance and thereby improved outputs.

Further, compared to the conventional product in which two independently-packed secondary batteries are connected in parallel, higher output improvement effect is provided because the characteristics of the unit cells disposed in one single package are variously adjusted depending on whether the unit cells are disposed at a central part or at a side part.

Further, electrochemical interactions among different unit cells of different characteristics are enabled, because the unit cells with different output characteristics are sealed within one single package and share the chemical species participating in the electrochemical reaction with each other.

Accordingly, even when the electrolyte is degraded near one of the unit cells or when the density of the operating ions such as lithium ions decreases, the electrolyte degradation and decreased operating ion density can be compensated with the diffusion of the electrolyte and the operating ions such that the output characteristics of the secondary battery can be maintained and the degradation of the secondary battery can be slowed.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the exemplary embodiments described herein, the secondary battery refers to the lithium secondary battery. The lithium secondary battery collectively refers to batteries in which lithium ions engage in electrochemical reactions with the active materials coated on the positive electrode and the negative electrode during charging or discharging.

However, those skilled in the art will be able to understand that the present disclosure is applicable to batteries other than the lithium secondary battery.

Figure 1:
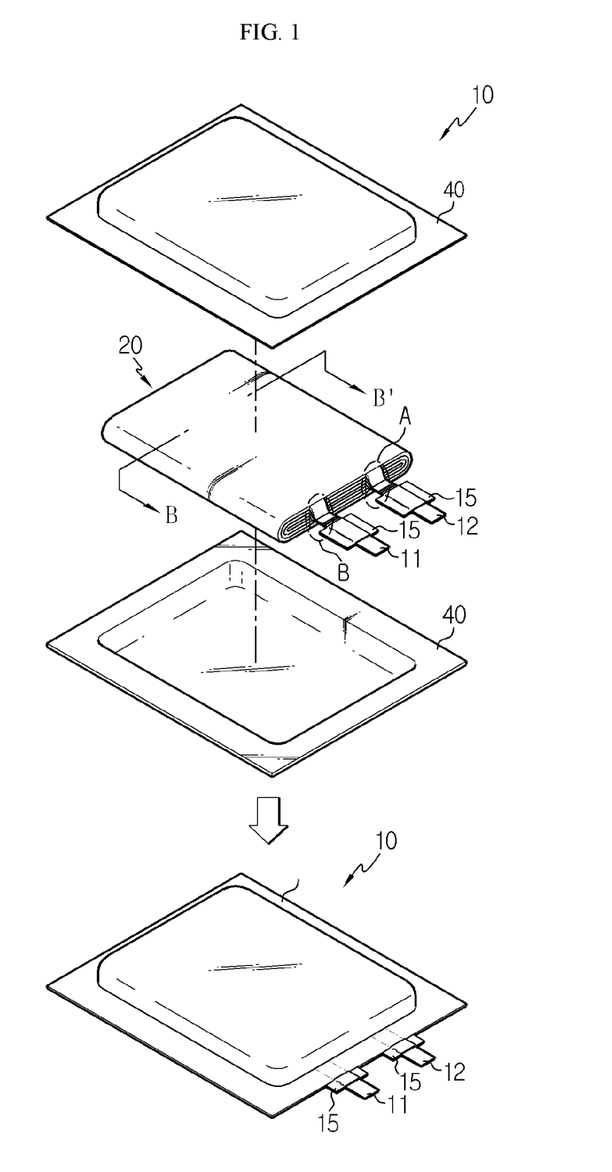
FIG. 1 is an exploded perspective view illustrating a schematic structure of a secondary battery with improved output characteristics according to an exemplary embodiment.
Figure 2:
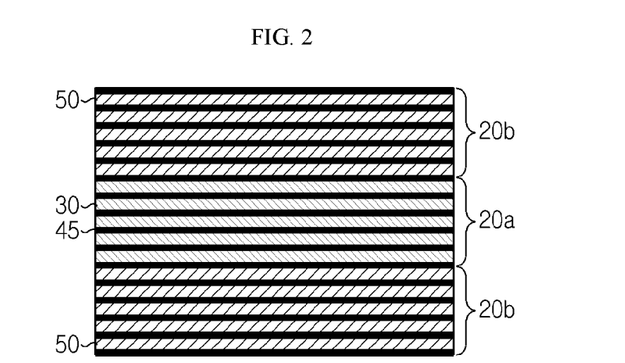
FIG. 2 is a cross-sectional view of FIG. 1 taken on line B-B'.
Figure 3:
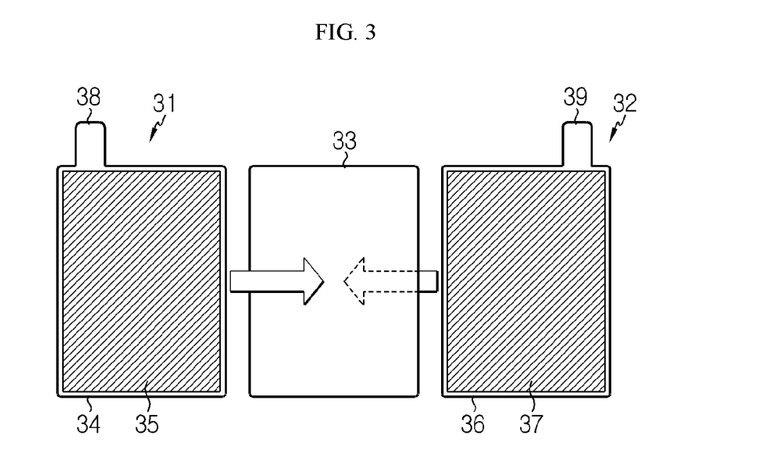
FIG. 3 is a perspective view illustrating a structure in which a positive electrode, an electrode separator, and a negative electrode are stacked in order.

FIG. 1 is an exploded perspective view illustrating a schematic structure of a secondary battery with improved output characteristics according to an exemplary embodiment, FIG. 2 is a cross-sectional view of FIG. 1 taken on line B-B', and FIG. 3 is a perspective view illustrating a structure in which a positive electrode, an electrode separator, and a negative electrode are stacked in order.

Referring to FIGS. 1 and 2, the secondary battery 10 according to an exemplary embodiment includes a cell assembly 20, and a pouch package 40 sealing the cell assembly 20 together with electrolyte.

The cell assembly 20 includes a central cell block 20a, and side cell blocks 20b disposed at both sides of the central cell block 20a. In this example, the central cell block 20a and the side cell blocks 20b are connected in parallel with each other.

The central cell block 20a includes a plurality of central cells 30 connected in parallel with each other, and the side cell blocks 20b include a plurality of side cells 50 connected in parallel with each other. In one example, the number of side cells 50 included in the side cell blocks 20b on the upper and lower sides may be equal to, or different from each other.

The pouch package 40 is a pouch type package widely used in the field of secondary battery and has a structure in which a thin flexible metal film (e.g., Al film) is laminated in between a water-resistant polymer film and a thermally adhesive polymer film. The pouch package will not be described in detail as it is already widely known.

The pouch package 40 includes an upper cover and a lower cover. Edges of the upper cover and the lower cover are heat-sealed by sealing process. The electrolyte may then be injected into the pouch package 40 while the sealing is in process. The upper cover and the lower cover may be separated from each other, or connected with each other at one sides thereof.

Meanwhile, the present disclosure provides substantial characteristics related to the structure of the cell assembly 20. Accordingly, it is to be understand that the pouch package 40 is only an example provided to illustrate a package that seals the cell assembly 20 and the electrolyte together. Accordingly, the pouch package 40 is replaceable with other package known in the art.

Referring to FIG. 3, the central cells 30 and the side cells 50 include at least a positive electrode 31, a negative electrode 32, and an electrode separator 33 interposed therebetween.

The positive electrode 31 has a structure in which positive electrode material coating layers 35 are formed on both surfaces of a positive electrode plate 34 formed from metal such as Al, and so on. The negative electrode 32 has a structure in which negative electrode material coating layers 37 are formed on both surfaces of a negative electrode plate 36 formed from metal such as Cu, and so on. Alternatively, the positive electrode material coating layer 35 and the negative electrode material coating layer 37 may be coated on only one surface of the positive electrode plate 34 and the negative electrode plate 36.

The positive electrode material coating layer 35 may include positive electrode active material particles that allow lithium ion intercalation or de-intercalation, a conductive material, and a binder.

In one example, the positive electrode active material particles may be particles of lithium metal oxide such as $LiMnO_2$, $LiCoO_2$, $LiFePO_4$, $LiNi_xCo_yMn_zO_2$ (x+y+z=1, at least one of x, y, z is not 0), the conductive material may be a carbon black, and the binder may be PVDF (polyvinylidene fluoride) polymer.

The negative electrode material coating layer 37 may include negative electrode active material particles that allow lithium ion intercalation or de-intercalation, a conductive material, and a binder. In one example, the negative electrode active material particles may be graphite particles, the conductive material may be a carbon black, and the binder may be PVDF polymer.

However, the present disclosure is not limited to certain types of the materials forming the positive electrode active material, negative electrode active material, conductive material, and binder.

The electrode separator 33 may be composed of porous polymer film such as polyolefin film. Further, coating layer of inorganic particles may be provided on at least one surface of the electrode separator 33. The inorganic coating layer has a structure in which interstitial volume is formed between inorganic particles as the inorganic particles are combined by the binder.

For such structure of the electrode separator 33, reference is made to PCT Publication WO/2006/025662, the disclosure of which is incorporated herein by reference in its entirety.

The inorganic particle may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3-PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$ and $Y_2O_3$.

A positive electrode tab 38 and a negative electrode tab 39 may be provided on the upper ends of the positive electrode plate 34 and the negative electrode plate 36, each by extending to protrude in a predetermined length.

The cell assembly 20 has a structure in which a plurality of cells are stacked, and the positive electrode tabs 38 and the negative electrode tabs 39 provided on each of the cells may be aggregated and then welded (see the reference numerals A and B in FIG. 1). Further, the aggregated and welded positive electrode tabs 38 are welded again with the positive electrode lead 11 of conductive metal material, and the aggregated and welded negative electrode tab 39 is also welded again with the negative electrode lead 12 of conductive metal material. The positive electrode lead 11 and the negative electrode lead 12 may be exposed to outside when the upper cover and the lower cover of the pouch package 40 are sealed.

A sealing tape 15 may be attached to central portions of the positive electrode lead 11 and the negative electrode lead 12. When the upper cover and the lower cover are sealed, the sealing tape 15 increases the adhesion property and the resistance of the metallic leads 11, 12 area against moist penetration.

As illustrated in FIG. 2, a plurality of cells forming the cell assembly 20 may be separated from one another by the cell separating film 45. That is, the cell separating film 45 may be interposed in the borders between the central cells 30, borders between the side cells 50, and borders between the central cells 30 and the side cells 50.

Next, before explaining the exemplary embodiments in detail, several terms will be defined as below for convenient understanding.

[First Positive Electrode Material Coating Layer, Second Positive Electrode Material Coating Layer]

The positive electrode active material coating layers coated respectively on the positive electrodes of the central cells 30 and the side cells 50 are referred to as the first positive electrode material coating layer and the second positive electrode material coating layer.

[Loading Energy Density]

The 'loading energy density' represents the capacity of the active material coating layer formed in a unit area (1 cm$^2$) of the positive electrode to react (intercalation or de-intercalation) with the lithium ions while the state of charge of the secondary battery 10 changes from 0 to 100%, and may be expressed by a number in unit, i.e., in mAh/cm$^2$.

When it is stated that the positive electrode has a loading energy density of certain number, it may be interpreted as meaning that the active material coating layer coated on the positive electrode has the corresponding loading energy density.

[Reference Cell]

When measuring the area specific resistance for a plurality of unit cells constituting the positive electrode and having different loading energy densities, the unit cell with average area specific resistance will be referred to as the 'reference cell'.

The loading energy density of the positive electrode may be varied by adjusting the thickness of the active material coated on the positive electrode.

Specifically, the area specific resistance may be measured for a plurality of unit cells constituting the positive electrode and having loading energy densities varying in a range of 1.0 to 4.0 mAh/cm$^2$, and the average area specific resistance is determined. The unit cell may then be fabricated such that the positive electrode has a loading energy density value that corresponds to the average area specific resistance, and the fabricated unit cell may be defined as the reference cell. The area specific resistance is measured when the SOC of the cell reaches 50%.

A plurality of cells used in the experiment for determining a reference cell include the same type of active material for the positive electrode and the negative electrode, and the active material layers have difference thicknesses from each other. For example, a cell with a higher loading energy density has a thick active material coating layer, whereas a cell with a lower loading energy density has a thin active material coating layer.

Hereinafter, exemplary embodiments of the present disclosure will be described in detail based on the definitions mentioned above.

According to the present disclosure, a loading energy density of the positive electrodes included in the central cells 30 is higher than the loading energy density of the positive electrode of the reference cell. Further, a loading energy density of the positive electrodes included in the side cells 50 is lower than the loading energy density of the positive electrode of the reference cell.

That is, a loading energy density of the positive electrodes of the central cells 30 is higher than a loading energy density of the positive electrodes of the side cells 50.

The positive electrodes of the central cells 30 may have a loading energy density of 3.9-4.1 mAh/cm$^2$, but not limited thereto. The positive electrodes of the side cells 50 may have a loading energy density of 1.6-1.8 mAh/cm$^2$, but not limited thereto. Further, for the secondary battery 10 as a whole, the average loading energy density of the positive electrodes may be 2.75-2.95 mAh/cm$^2$.

In one aspect, the positive electrode material coating layer coated on the positive electrodes of the central cells 30 and the side cells 50 may contain positive electrode material particles having the same chemical composition and/or physical characteristic (average particle diameter, etc.) to meet the loading energy density condition mentioned above, but the coating layers may have different thicknesses.

In another aspect, the positive electrode material coating layer coated on the positive electrodes of the central cells 30 and the side cells 50 may include substantially the same content of conductive material. Preferably, the positive electrode material coating layer coated on the positive electrodes of the side cells 50 may have a greater content of the conductive material than the positive electrode material coating layer coated on the positive electrode of the central cells 30.

In yet another aspect, the positive electrode material coating layer coated on the positive electrodes of the central cells 30 and the side cells 50 may contain positive electrode material particles having different chemical compositions and/or physical characteristics (average particle diameter, etc.), but the coating layers may have different thicknesses.

More preferably, the first positive electrode material coating layer formed on the positive electrodes of the central cells 30 may be thicker than the second positive electrode material coating layer formed on the positive electrodes of the side cells 50.

When the positive electrode material coating layer coated on a unit area is thick, the loading energy density may increase.

Meanwhile, when the positive electrode active materials have the same ingredients, the loading energy density of the positive electrode and the area specific resistance of the cells are in inverse proportion to each other. That is, when the loading energy density of the positive electrode is high, the area specific resistance decreases, while when the loading energy density of the positive electrode decreases, then the area specific resistance increases.

The central cells 30 have a higher loading energy density of the positive electrode than the reference cell. Accordingly, the central cells 30 have a lower area specific resistance than the reference cell. Further, the side cells 50 have a lower loading energy density of the positive electrode than the reference cell. Accordingly, the side cells 50 have a higher area specific resistance than the reference cell.

Meanwhile, when the central cells 30 and the side cells 50 with the adjusted loading energy density of the positive electrode are connected in parallel, the resistance becomes lower than when two reference cells are connected in parallel.

For example, it is assumed that the resistance of the reference cell is 2 mΩ, and the resistance of the central cells 30 and the side cells 50 are 1 mΩ and 3 mΩ, respectively.

Generally, the entire resistance of a circuit having resistors $R_1$ and $R_2$ connected in parallel can be calculated by equation 1 below.

$$R_{//} = \frac{R_1 \times R_2}{R_1 + R_2} \qquad \langle \text{Equation 1} \rangle$$

(where, $R_1$ and $R_2$ each refer to the resistance values of the resistors connected in parallel).

By applying Equation 1 to the above assumption, the resistance of the circuit having two reference cells connected in parallel is calculated to be 1 mΩ ($R_1=R_2=2$ mΩ), and the resistance of the circuit having the central cells 30 and the side cells 50 connected in parallel is calculated to be ¾ mΩ ($R_1=1$ mΩ, $R_2=3$ mΩ).

From this, it is confirmed that, when the central cells 30 and the side cells 50 with the adjusted loading energy density of the positive electrodes are connected in parallel, the resistance will be lower than when two reference cells are connected in parallel.

Meanwhile, the output of the secondary battery 10 can be further improved by varying the composition of the positive electrode material coating layer coated on the positive electrodes of the side cells 50 and optionally, the electrode separator such that the total resistance of the side cells 50 becomes lower than the total resistance of the central cells 30.

In order to reduce the total resistance of the side cells 50 compared to the total resistance of the central cells 30, for one example, the total number of side cells 50 may be greater than the total number of central cells 30.

In order to reduce the total resistance of the side cells 50 compared to the total resistance of the central cells 30, for another example, the second positive electrode material coating layer may have the positive electrode material particles with the average particle diameter being smaller than that of the first positive electrode material coating layer by 10-30%.

When the average particle diameter of the positive electrode material coated on the positive electrodes of the side cells is relatively lower, the contact resistance among the particles decreases, and the diffusion distance decreases when the lithium ions are de-intercalated from the positive electrode material or intercalated into the positive electrode material. As a result, the total resistance of the side cells 50 decreases.

In order to reduce the total resistance of the side cells 50 compared to the total resistance of the central cells 30, for yet another example, the second positive electrode material coating layer may have the content of the conductive material greater than the first positive electrode material coating layer by about 10-30%. When the conductive material content increases, the positive electrode will have enhanced conductivity. Accordingly, the total resistance of the side cells 50 will be decreased compared to the total resistance of the central cells 30.

In order to reduce the total resistance of the side cells 50 compared to the total resistance of the central cells 30, for yet another example, the electrode separator included in the side cells 50 may have a lower resistance than the electrode separator included in the central cells 30 by about 20-40%. Because the moving speed of lithium ions increases as the resistance of the electrode separator decreases, the total resistance of the side cells 50 decreases compared to the total resistance of the central cells 30.

In one example, the resistance of the separator may be adjusted by varying a type of the material constructing the porous substrate, or by varying the thickness of the porous substrate, thickness of the inorganic coating layer formed on the surface of the substrate, type of inorganic particles, diameter of the inorganic particles, and so on.

In the side cells 50 as described above, when the average particle diameter of the positive electrode material particles decreases, or conductive material content increases, or resistance of the electrode separator decreases, the reaction kinetics of the lithium ions will increase and the total resistance of the side cells 50 will decrease accordingly. As a result, the output of the secondary battery 10 can be improved.

Meanwhile, the secondary battery 10 according to the present disclosure has yet another technical characteristics in the electrode structure disposed in the border between the central cell block 20a and the side cell block 20b.

Figure 4:
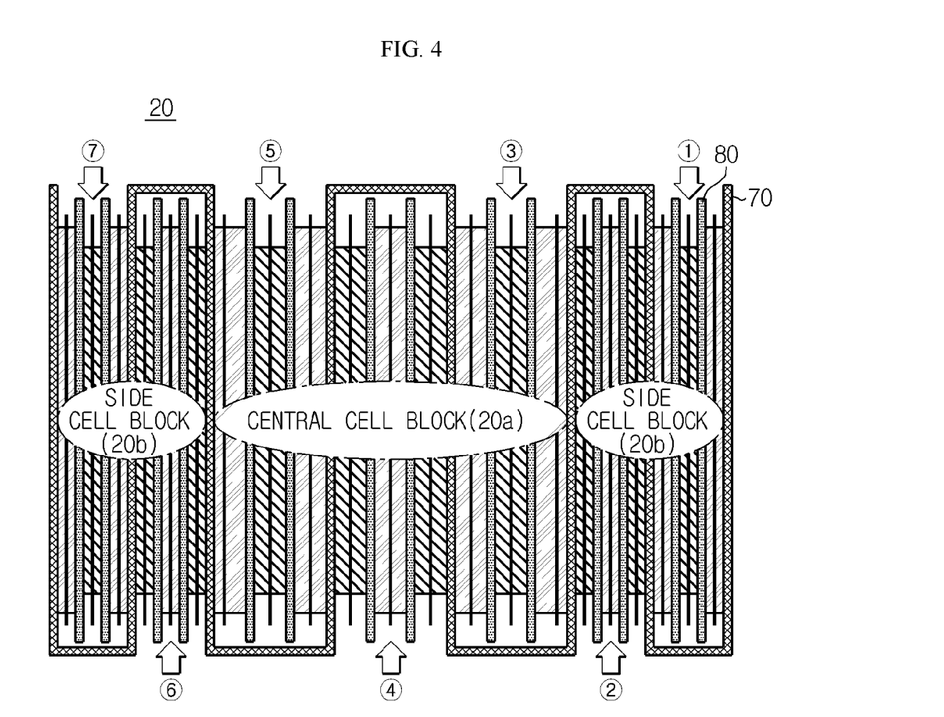
FIG. 4 is a cross-sectional view illustrating in detail a structure of a cell assembly according to an exemplary embodiment.
Figure 5:
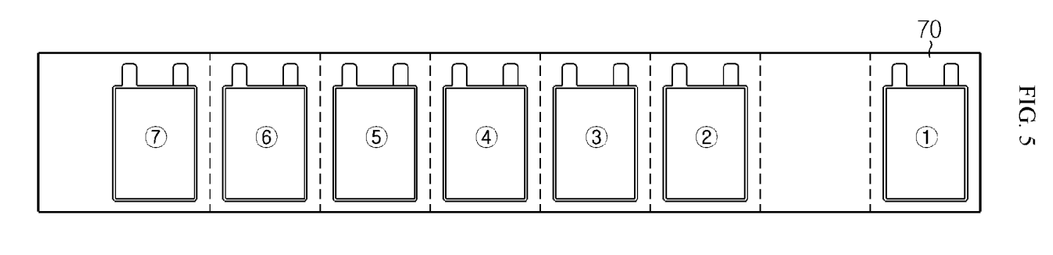
FIG. 5 is a conceptual process diagram illustrating a method for constructing the cell assembly of FIG. 4.
Figure 6:
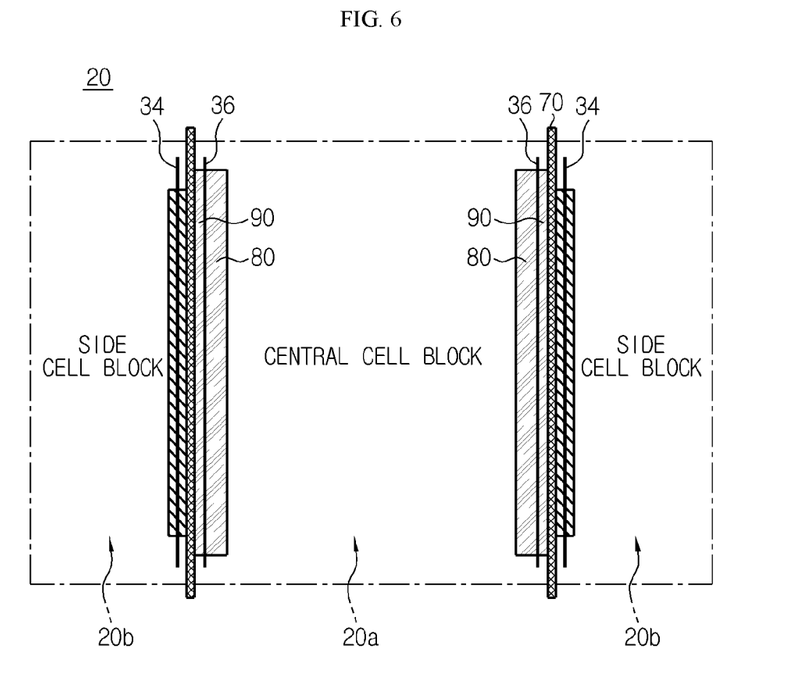
FIG. 6 is a partial cross sectional view partially illustrating a structure of electrodes disposed at borders between central cell blocks and side cell blocks.

FIG. 4 is a cross-sectional view illustrating in detail a structure of a cell assembly 20 according to an exemplary embodiment, FIG. 5 is a conceptual process diagram illustrating a method for constructing the cell assembly 20 of FIG. 4, and FIG. 6 is a partial cross sectional view partially illustrating a structure of electrodes disposed at borders between the central cell block 20a and side cell blocks 20b.

Referring to FIG. 4, the cell assembly 20 as illustrated has a plurality of bi-cells that construct the central cell block 20a and the side cell blocks 20b.

The bi-cell has a structure in which the positive electrode or the negative electrode is placed in the middle, and the electrodes of the opposite polarity to that of the electrode in the middle are placed at both sides of the positive electrode or the negative electrode in the middle.

The bi-cell is classified into a positive electrode type bi-cell (hereinafter, 'C cell'), and a negative electrode type bi-cell (hereinafter, 'A cell'). The former has a structure in which the positive electrode is in the middle and negative electrodes are at both sides of the positive electrode. In contrast, the latter has a structure in which the negative electrode is in the middle and the positive electrodes are at both sides of the negative electrode.

There are three bi-cells included in the central cell block 20a, in which the middle cell ④ is a A cell having positive electrode/negative electrode/positive electrode structure, and the cells ③, ⑤ on the left and right sides of the middle cell ④ are C cell having negative electrode/positive electrode/negative electrode.

Further, there are two bi-cells included in the side cell block 20b, in which the cells ②, ⑥ adjacent to the central cell block 20b are A cells, and the cells ①, ⑦ disposed outside are C cells.

When the cell assembly 20 is composed of the bi-cells, each of the bi-cells includes two sheets of electrode separators 80. Further, adjoining bi-cells are separated by the cell separating film 70.

Similarly to the electrode separator 80 described above, the cell separating film 70 may be composed of a porous polymer film, and optionally, inorganic coating layer may be provided on the surface of at least one side. Preferably, the cell separating film 70 may have the same specification as the electrode separator 33 described above.

The cell assembly 20 illustrated in FIG. 4 may be fabricated by the stack folding process illustrated in FIG. 5. That is, the cell assembly 20 illustrated in FIG. 4 may be fabricated by arranging cells ①-⑦ having the bi-cell structure on a strip-shaped cell separating film 70 extended in one direction, and then folding the cell separating film 70 together with the cells to one direction. In the drawing, the vertical dotted line represents the portions where the cell separating film 70 is folded.

Meanwhile, in the cell assembly 20, the negative electrode of the outermost cell positioned on the outermost side of the central cell block 20a may have a different structural characteristic than the negative electrodes disposed on other location of the central cell block 20a.

Specifically, the negative electrodes of the cells forming the cell assembly 20 have the negative electrode material coating layers coated on both surfaces to substantially the same thickness. However, as illustrated in FIG. 6, the negative electrode of the outermost cell has the negative electrode material coating layers that are asymmetrically coated.

That is, with reference to the negative electrode plate 36, when it is defined that the negative electrode material coating layer closer to the center of the central cell block 20a is the inner coating layer 80, and the negative electrode material coating layer closer to the side cell block 20b is the outer coating layer 90, the inner coating layer 80 is thicker than the outer coating layer 90.

The inner coating layer 80 undergoes electrochemical reaction with the positive electrode included in the outermost cell of the central cell block 20a, and the outer coating layer 90 undergoes electrochemical reaction with the positive electrode included in the outermost cell of the side cell block 20b.

Note that the coating layer of the active material formed on the positive electrode included in the outermost cell of the central cell block 20a is thick, and the coating layer of the active material formed on the positive electrode included in the outermost cell of the side cell block 20b is thin.

Accordingly, by asymmetrically adjusting the thickness of the inner coating layer 80 and the outer coating layer 90 as described above, it is possible to design a battery structure that corresponds to the thickness of the positive electrode active material coating layer opposed to each of the coating layers 80, 90.

The structural characteristic described above with reference to FIG. 6 is similarly applicable to when the electrode placed on the outermost side of the central cell block 20a is a positive electrode. In this case, among the positive electrode material coating layers formed on both surfaces of the positive electrode plate, the inner positive electrode material coating layer closer to the center of the central cell block 20a may be thicker than the outer positive electrode material coating layer closer to the side cell block 20b.

Meanwhile, according to the present disclosure, the cell separating film 70 may not be continuously connected. That is, the cell separating film interposed between adjacent cells may be separated from each other, as in the case of the electrode separator. In this case, the cell assembly 20 may be fabricated by the alternate stacking process of the cells and the cell separating films.

Further, the present disclosure is not limited to the example that the central cells 30 and the side cells 50 have the bi-cell structure only. Accordingly, an example that the central cells 30 and the side cells 50 have a full cell structure, in which the electrodes with opposite polarities are disposed on the outermost sides of the cells such as 'positive electrode/separator/negative electrode', 'positive electrode/separator/negative electrode/separator/positive electrode/ separator/negative electrode' or the like, may also fall under the scope of the present disclosure.

EXAMPLES

Hereinbelow, results of experiments conducted to verify the effect of improved energy density and output characteristics of the secondary battery according to the present disclosure will be disclosed.

The following experiment results are provided only to exemplify the effects of the present disclosure, and those skilled in the art will understand that these are not to be construed as limiting the scope of the present disclosure.

1. Example 1

1.1. Comparative Example 1-1

Fabrication of Reference Secondary Battery

First, $LiNi_xCo_yMn_zO_2$ power having 10 um of average particle diameter, and graphite powder having 10 um of average particle diameter were selected for the positive electrode active material and the negative electrode active material, respectively.

Figure 7:
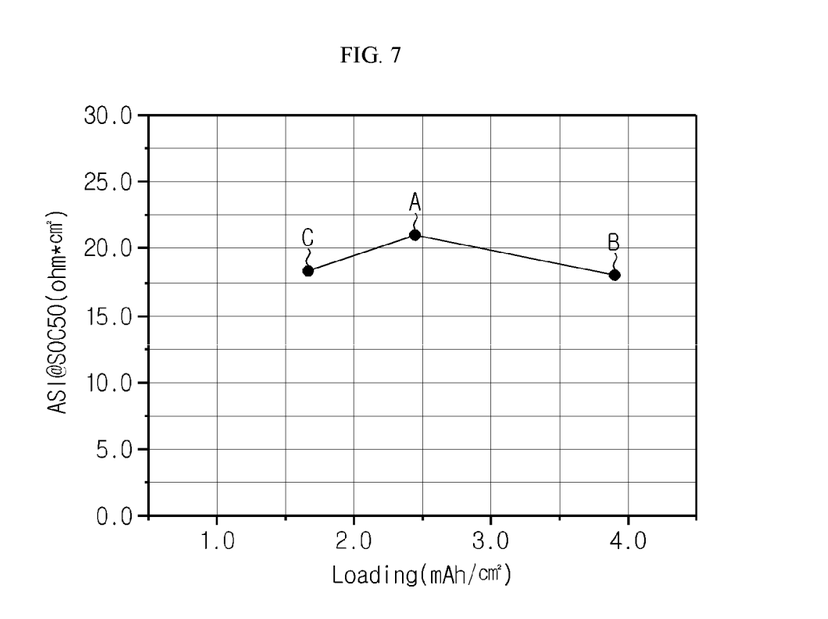
FIG. 7 is a graph showing results of measuring the loading energy density and area specific resistance of the positive electrode regarding the unit cells fabricated by Example 1 of the present disclosure.

The positive electrode slurry was then prepared by adjusting an amount of raw materials such that the contents of the positive electrode active material, conductive material (carbon black), and binder (PVDF) included in the positive electrode material coating layer were 90:5:5 (weight ratio), and the positive electrode was fabricated by coating the positive electrode slurry on both surfaces of the Al positive electrode plate, and drying and compressing the coating layer. At this time, the thickness of the coating layer was adjusted such that the loading energy density of the positive electrode was 2.4 mAh/cm$^2$. The loading energy density as mentioned above corresponds to the specification of the secondary battery cell for PHEV (see 'A' in FIG. 7). Further, a negative electrode was fabricated by preparing a negative electrode slurry by mixing the negative electrode active material, conductive material (carbon black), and binder (PVDF), and then coating the negative electrode slurry on both surfaces of the Cu negative electrode plate, followed by drying and compressing. At this time, the thickness of the negative electrode coating layer was properly adjusted to correspond to the loading energy density of the positive electrode.

Next, eleven C cells and ten A cells for use as the reference cell were prepared by stacking the positive electrodes and the negative electrodes, prepared by the process described above, into the positive electrode type bi-cell (C cell) structure and negative electrode type bi-cell (A cell) structure.

The electrode separator used in the fabrication of the bi-cells has a structure in which inorganic particles ($Al_2O_3$) having average particle diameter of 5 um is coated on both surfaces of a 16 um-thick, PE (PolyEthylene) porous substrate by using the binder (PVDF) to 5 um of thickness.

Next, cell assembly was completed by arranging the eleven C cells and ten A cells alternately on the cell separating film having the same specification as the electrode separator and extending in a strip shape, stack folding the same, and then performing electrode tap welding and electrode lead welding. The cell assembly completed as described above includes 21 unit cells.

A pouch-type secondary battery in the structure as illustrated in FIG. 1 was then fabricated, by sandwiching the cell assembly between the upper cover and the lower cover of the pouch package and then performing the sealing and electrolyte injection processes.

For the electrolyte injection process, a liquid electrolyte including an organic solvent mixture of ethylene carbonate (EC) and ethylmethyl carbonate (EMC) in volume ratio of 3:7, added with lithium salt (LiPF$_6$), was used.

The thickness of the secondary battery and the total area of the unit cells according to Comparative Example 1-1 were measured to be 10.49 mm and 16129 cm$^2$, respectively, the area specific resistance of one unit cell was measured to be 20.3 Ωcm$^2$, the resistance of the secondary battery was measured to be 1.30 mΩ, and the energy density per unit volume was measured to be 347 Wh/L.

1.2. Example 1-1

Fabrication of Secondary Battery with Positive Electrode of High Loading Energy Density Like Comparative Example 1-1, LiNi$_x$Co$_y$Mn$_z$O$_2$ power having 10 um of average particle diameter, and graphite powder having 10 um of average particle diameter were selected for the positive electrode active material and the negative electrode active material, respectively.

The process similar to that of Comparative Example 1-1 was then performed to fabricate five C cells and four A cells. The same type of electrode separator and cell separating film that were used in Comparative Example 1-1 were also used in the fabrication of each cell.

In Example 1-1, when the cell was fabricated, the thickness of the positive electrode coating layer was increased compared to the Comparative Example such that the loading energy density of the positive electrode was 3.8 mAh/cm$^2$. The loading energy density as mentioned above corresponds to the specification of the secondary battery cell for EV (see 'B' in FIG. 7). Further, the thickness of the negative electrode coating layer was increased more than the negative electrode coating layer of Comparative Example 1-1 so as to correspond to the loading energy density of the positive electrode.

The process of fabricating the cell assembly in Example 1-1 was identical to that in Comparative Example 1-1, except that five C cells and four A cells are stacked such that the C cells and A cells are alternately stacked in C/A/C/A/C/A/C/A/C pattern with the cell separating film interposed therebetween. The cell assembly stacked as described above includes 9 unit cells.

The thickness of the secondary battery and the total area of the unit cells according to Example 1-1 were measured to be 6.54 mm and 6763.74 cm$^2$, respectively, the area specific resistance of one unit cell was measured to be 18.2 Ωcm$^2$, and the resistance of the secondary battery was measured to be 2.69 mΩ.

1.3. Example 2-1

Fabrication of Secondary Battery with Positive Electrode of Low Loading Energy Density Like Example 1-1, LiNi$_x$Co$_y$Mn$_z$O$_2$ power having 10 um of average particle diameter, and graphite powder having 10 um of average particle diameter were selected for the positive electrode active material and the negative electrode active material, respectively.

The process similar to that of Comparative Example 1-1 was then performed to thus fabricate six C cells and six A cells. The same type of electrode separator and cell separating film that were used in Comparative Example 1-1 were also used in the fabrication of the cells.

Difference from Comparative Example 1-1 is that the thickness of the positive electrode coating layer was decreased compared to the positive electrode coating layer in Comparative Example 1-1 such that the loading energy density of the positive electrode was 1.67 mAh/cm$^2$. The loading energy density as mentioned above corresponds to the specification of the secondary battery cell for HEV (see 'C' in FIG. 7). Further, the thickness of the negative electrode coating layer was decreased compared to the negative electrode coating layer of Comparative Example 1-1 so as to correspond to the loading energy density of the positive electrode. Further, the resistance of the positive electrode was decreased by relatively increasing the content the conductive materials compared to Comparative Example 1-1, by adjusting the content of the positive electrode active material, the conductive material, and the binder in the positive electrode coating layer from 90:5:5 (weight ratio) to 88.5:8.5:3 (weight ratio).

The process of fabricating the cell assembly in Example 2-1 was identical to that in Comparative Example 1-1, except that six C cells and six A cells are stacked such that the C cells and A cells are alternately stacked used in C/A/C/A/C/A/C/A/C/A/C/A pattern with the cell separating film interposed therebetween. The cell assembly stacked as described above includes 12 unit cells.

The thickness of the secondary battery and the total area of the unit cells according to Example 2-1 were measured to be 3.95 mm and 9365.18 cm$^2$, respectively, the area specific resistance of one unit cell was measured to be 18.2 Ωcm$^2$ which is substantially identical to Example 1-1, and the resistance of the secondary battery was measured to be 1.94 mΩ.

1.4. Example 3-1

Fabrication of Secondary Battery According to the Present Disclosure

Like Example 1-1, LiNi$_x$Co$_y$Mn$_z$O$_2$ power having 10 um of average particle diameter, and graphite powder having 10 um of average particle diameter were selected for the positive electrode active material and the negative electrode active material, respectively.

Then five $C_1$ cells and four $A_1$ cells to be disposed in the central cell block area were fabricated in the same specification as Example 1-1. The only difference was that the thickness of the outermost negative electrode coating layers of the $C_1$ cells disposed in the leftmost and rightmost sides of the central cell block was asymmetrically adjusted as illustrated in FIG. 6. Then six $C_2$ cells and six $A_2$ cells to be disposed in the side cell block were fabricated in the same specification as Example 2-1. The subscripts '1' and '2' used herein indicate that the corresponding cells are those that are fabricated in the same specification as Examples 1-1 and 2-1, respectively.

The process of fabricating the cell assembly in Example 3-1 was identical to Comparative Example 1-1, except that the four types of cells were alternately stacked in a $C_2/A_2/C_2/A_2/C_2/A_2/C'_1/A_1/C_1/A_1/C_1/A_1/C_1/A_1/C'_1/A_2/C_2/A_2/C_2/A_2/C_2$ pattern with the cell separating films being interposed therebetween. '$C'_1$' used herein refers to the $C_1$ cells disposed in the leftmost and rightmost sides of the central cell block, in which the negative electrode coating layers of the outermost negative electrodes were asymmetrically formed.

Like the secondary battery in Comparative Example 1-1, the cell assembly fabricated according to Example 3-1 includes 21 unit cells.

The thickness of the secondary battery and the total area of the unit cells according to Example 3-1 were measured to be 10.49 mm and 16129 cm$^2$, respectively, which were substantially the same as the thickness of the secondary battery and the total area of the unit cells according to Comparative Example 1-1. Further, the volume of the secondary battery of Example 3-1 substantially corresponds to the sum of the volume of the secondary battery in Example 1-1 and the volume of the secondary battery in Example 2-1.

In contrast, the resistance of the secondary battery in Example 3-1 was measured to be 1.13 mΩ which was lower than the Comparative Example by about 10.43%, and the energy density of the secondary battery was measured to be 354.2 Wh/L which was greater than the Comparative Example by 1.97%. As the resistance decreases as described above, the output of the secondary battery increases in proportion to the decrease in resistance.

1.5. Evaluation of Example 1

In the cell assembly of Example 3-1, the loading energy density of the positive electrodes of the central cells is greater than that of the positive electrodes of the side cells.

Further, the side cells are identical to the cells included in the secondary battery of Example 2-1, and the central cells are identical to the cells included in the secondary battery of Example 1-1.

Accordingly, the total resistance of the side cells are substantially identical to 1.94 mΩ which is the resistance value of the secondary battery of Example 2-1. Further, the total resistance of the central cells are substantially identical to 2.69 mΩ which is the resistance value of the secondary battery of Example 1-1.

The resistance of the secondary battery in Example 3-1 is 1.13 mΩ which is lower than that of the secondary battery in Comparative Example that has the same volume and thickness. The above result is achieved by decreasing the total resistance of the side cells compared to the total resistance of the central cells, and connecting the side cells and the central cells having the adjusted loading energy density of the positive electrodes in parallel with one another.

The above experiment result indicates that, by decreasing the loading energy density and the resistances of the positive electrodes disposed at the side part of the cell assembly compared to those of the positive electrodes disposed at the central part of the cell assembly, it is possible to decrease the total resistance of the secondary battery and thus improve the output characteristics thereof.

2. Example 2

2.1. Comparative Example 1-2

Fabrication of Reference Secondary Battery

The reference secondary battery was fabricated with substantially the same method as Comparative Example 1-1 of Example 1. The cell assembly included eleven C cells and ten A cells. The loading energy density of the positive electrode was set to 2.5 mAh/cm$^2$ by adjusting the thickness of the coating layer.

The thickness of the reference secondary battery and the total area of the unit cells were measured to be 10.50 mm and 16129 cm$^2$, respectively, the area specific resistance of one unit cell was measured to be 22.5 Ωcm$^2$, the resistance of the secondary battery was measured to be 1.40 mΩ, and the energy density per unit volume was measured to be 347 Wh/L.

Figure 8:
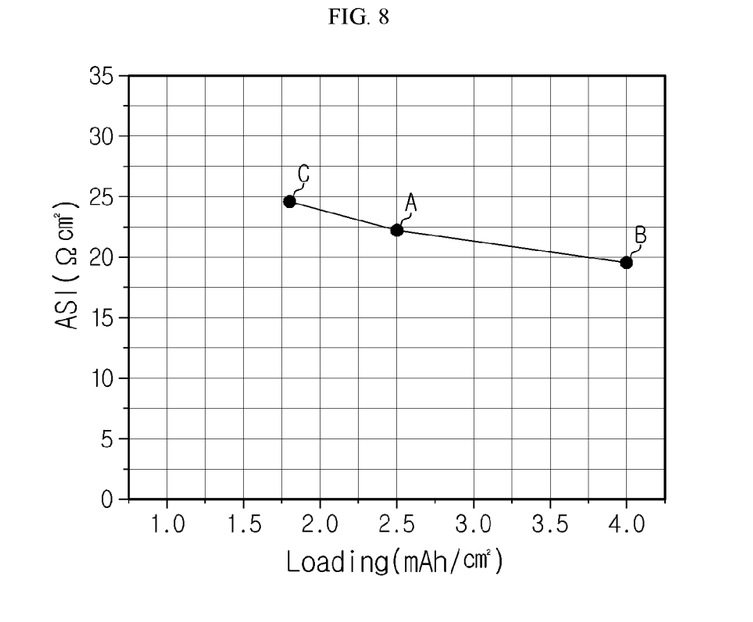
FIG. 8 is a graph showing results of measuring the loading energy density and area specific resistance of the positive electrode regarding the unit cells fabricated by Example 2 of the present disclosure.

FIG. 8 is a graph showing results of measuring the area specific resistance of the positive electrode according to the loading energy density, regarding the unit cells fabricated by Example 2. The specification of the unit cells fabricated in Comparative Example 1-2 corresponds to dot A in FIG. 8 and is suitable for use in PHEV.

2.2. Example 1-2

Fabrication of Secondary Battery with Positive Electrode of High Loading Energy Density The secondary battery according to Example 1-2 was fabricated with the same process as in Example 1-1. The cell assembly was fabricated by alternately stacking total seven cells including four C cells and three A cells into a C/A/C/A/C/A/C with the cell separating films being interposed therebetween.

The thickness of the positive electrode coating layer was increased compared to Comparative Example 1-2 such that the loading energy density of the positive electrodes included in the respective cells was 4.0 mAh/cm$^2$. Further, the thickness of the negative electrode coating layer was increased compared to Comparative Example 1-2 so as to correspond to the loading energy density of the positive electrode.

The thickness of the secondary battery and the total area of the unit cells according to Example 1-2 were measured to be 5.135 mm and 5203 cm$^2$, respectively, the area specific resistance of one unit cell was measured to be 18.8 Ωcm$^2$, and the resistance of the secondary battery was measured to be 3.62 mΩ.

The specification of the unit cells fabricated in Example 1-2 corresponds to dot B in FIG. 8 and is suitable for use in EV.

2.3. Example 2-2

Fabrication of Secondary Battery with Positive Electrode of Low Loading Energy Density The secondary battery according to Example 2-2 was fabricated with the same process as in Example 2-1. The cell assembly was fabricated by alternately stacking total 14 cells including seven C cells and seven A cells into a C/A/C/A/C/A/C/A/C/A/C/A/C/A with the cell separating films being interposed therebetween. The types of the chemical species forming the coating layers of the positive electrode and the negative electrode, average particle diameters, conductive material contents, and so on were identical to Example 1-2. This is in contrast to Example 2-1 in which the conductive material content included in the positive electrode coating layer was increased than Example 1-1.

The thickness of the positive electrode coating layer was decreased compared to Comparative Example 2-2 such that the loading energy density of the positive electrodes included in the respective cells was 1.8 mAh/cm$^2$. Further, the thickness of the negative electrode coating layer was also decreased compared to Comparative Example 2-2 so as to correspond to the loading energy density of the positive electrode.

The thickness of the secondary battery and the total area of the unit cells according to Example 2-2 were measured to be 5.365 mm and 10926 cm$^2$, respectively, the area specific resistance of one unit cell was measured to be 24.6 52 $\Omega$cm$^2$, and the resistance of the secondary battery was measured to be 2.25 m$\Omega$.

The specification of the unit cells fabricated in Example 2-2 corresponds to dot C in FIG. 8 and is suitable for use in HEV.

2.4. Example 3-2

Fabrication of Secondary Battery According to the Present Disclosure

According to the same specification as Example 2-1, four $C_1$ cells and three $A_1$ cells to be disposed in the central cell block area were fabricated. The only difference was that the thickness of the outermost negative electrode coating layers of the $C_1$ cells disposed in the leftmost and rightmost sides of the central cell block were asymmetrically adjusted as illustrated in FIG. 6.

According to the same specification as Example 2-2, seven $C_2$ cells and seven $A_2$ cells to be disposed in the side cell block were fabricated.

In describing the four types of cells $C_1$, $C_2$, $A_1$ and $A_2$ cells, the subscripts '1' and '2' used herein indicate that the corresponding cells are those that are fabricated in the same specification as Examples 1-2 and 2-2, respectively.

The cell assembly was fabricated by alternately stacking total 21 cells of four different types in a C2/A2/C2/A2/C2/A2/C2/A2/C'1/A1/C1/A1/C1/A1/C'1/A2/C2/A2/C2/A2/C2 pattern with the cell separating films being interposed therebetween. 'C'1' used herein refers to the C1 cells disposed in the leftmost and rightmost sides of the central cell block, in which the negative electrode coating layers of the outermost negative electrodes were asymmetrically formed.

The thickness of the secondary battery and the total area of the unit cells according to Example 3-2 were measured to be 10.50 mm and 16129 cm$^2$, respectively, which were substantially the same as the thickness of the secondary battery and the total area of the unit cells according to Comparative Example 1-2. Further, the volume of the secondary battery of Example 3-2 substantially corresponds to the sum of the volume of the secondary battery in Example 1-2 and the volume of the secondary battery in Example 2-2.

Meanwhile, the resistance of the secondary battery in Example 3-2 was measured to be 1.39 m$\Omega$ which was lower than Comparative Example 1-2 by about −0.7%, and the energy density of the secondary battery was measured to be 349 Wh/L which was greater than the Comparative Example by 0.5%. As the resistance decreases as described above, the output of the secondary battery increases in proportion to the decrease in resistance thereof.

2.5. Evaluation of Example 2

In the cell assembly of Example 3-2, the loading energy density of the positive electrodes of the central cells is greater than that of the positive electrodes of the side cells. Further, the side cells are identical to the cells included in the secondary battery of Example 2-2, and the central cells are identical to the cells included in the secondary battery of Example 1-2.

Accordingly, the total resistance of the side cells are substantially identical to 2.25 m$\Omega$ which is the resistance value of the secondary battery of Example 2-2. Further, the total resistance of the central cells are substantially identical to 3.62 m$\Omega$ which is the resistance value of the secondary battery of Example 1-2.

The resistance of the secondary battery in Example 3-2 is 1.39 m$\Omega$ which is lower than that of the secondary battery in Comparative Example 1-2 that has the same volume and thickness. The above result is achieved by decreasing the total resistance of the side cells compared to the total resistance of the central cells, and connecting the side cells and the central cells having the adjusted loading energy density of the positive electrodes in parallel with one another.

Example 2 indicates that by adjusting the thickness of the positive electrode material coating layer, it is possible to increase the loading energy density of the positive electrodes disposed at the central part of the cell assembly compared to the positive electrodes disposed at the side part, and at the same time, by adjusting the total resistance of the side cells to be lower than the total resistance of the central cells, it is possible to reduce the total resistance of the secondary battery and thus improve the output characteristics thereof.

The resistance decrease of the secondary battery and increase in the energy density as observed in Example 2 are relatively lower than Example 1. However, a high-capacity secondary battery pack mounted to an electrically-driven vehicle includes from several tens to several hundreds of secondary batteries. Considering this, the energy density and output can be greatly improved on a secondary battery pack level.

Meanwhile, because the cells having the positive electrode with different loading energy densities can share the electrolyte in the same package, even when a certain cell or some of the entire cells are degraded, the other cells can maintain the performance of the secondary battery.

Further, in a secondary battery according to the present disclosure, the path for the movement of lithium ions is relatively short, because the positive electrodes at the side part have the same or greater area specific resistance than the positive electrodes at the central part, but have a thinner thickness of the active material coating layers than the central part. Accordingly, the side part has more active lithium ion intercalation or de-intercalation than the central part. In this example, because the lithium ions are rapidly supplemented from the central part with higher energy density to the side part, possible deviations of lithium ion concentration within the secondary battery can be rapidly alleviated, and accordingly, all the cells can exhibit optimum performance.

Further, even when there occurs an area in the secondary battery where the electrolyte performance is degraded, the electrolyte in the adjacent areas will be diffused thereto, thus compensating for the degradation of the electrolyte. Accordingly, all cells can maintain optimum performance, and degradation of the secondary battery can be slowed down.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

INDUSTRIAL APPLICABILITY

According to the present disclosure, the secondary battery may have not only the increased energy density per unit volume, but also the reduced resistance and thereby improved outputs.

Further, compared to the conventional product in which two independently-packed secondary batteries are connected in parallel, higher output improvement effect is provided because the characteristics of the unit cells disposed in one single package are variously adjusted depending on whether the unit cells are disposed at a central part or at a side part.

Further, electrochemical interactions among different unit cells of different characteristics are enabled, because the unit cells with different output characteristics are sealed within one single package and share the chemical species participating in the electrochemical reaction with each other.

Accordingly, even when the electrolyte is degraded near one of the unit cells or when the density of the operating ions such as lithium ions decreases, the electrolyte degradation and decreased operating ion density can be compensated with the diffusion of the electrolyte and the operating ions such that the output characteristics of the secondary battery can be maintained and the degradation of the secondary battery can be slowed.

What is claimed is:

1. A secondary battery comprising a cell assembly including a plurality of cells connected in parallel and an electrolyte within one single package,
wherein positive electrodes of a plurality of central cells disposed at a central part of the cell assembly have a greater loading energy density than positive electrodes of a plurality of side cells disposed at a side part,
wherein the positive electrodes of the central cells have a thicker positive electrode material coating layer formed on surfaces of the positive electrodes than the positive electrodes of the side cells, and
wherein an outermost electrode of the plurality of central cells comprises an electrode plate and an inner coating layer disposed toward a center of the cell assembly and an outer coating layer disposed toward the side cells, the inner coating layer and the outer coating layer respectively coated on both surfaces of the electrode plate, and the inner coating layer is thicker than the outer coating layer.

2. The secondary battery of claim 1, wherein a total resistance of the side cells is less than a total resistance of the central cells.

3. The secondary battery of claim 1, wherein the positive electrodes of the central cells have a loading energy density of 3.9-4.1 mAh/cm$^2$, and the positive electrodes of the side cells have a loading energy density of 1.6-1.8 mAh/cm$^2$.

4. The secondary battery of claim 1, wherein a first positive electrode material coating layer formed on the positive electrodes of the central cells and a second positive electrode material coating layer formed on the positive electrodes of the side cells comprise positive electrode material particles with the same chemical composition and average particle diameter.

5. The secondary battery of claim 1, wherein a first positive electrode material coating layer formed on the positive electrodes of the central cells and a second positive electrode material coating layer formed on the positive electrodes of the side cells comprise the same content of a conductive material.

6. The secondary battery of claim 1, wherein a first positive electrode material coating layer formed on the positive electrodes of the central cells and a second positive electrode material coating layer formed on the positive electrodes of the side cells comprise positive electrode material particles with different chemical compositions from each other.

7. The secondary battery of claim 1, wherein the positive electrodes of the central cells comprise a first positive electrode material coating layer containing first positive electrode material particles and a conductive material,
the positive electrodes of the side cells comprise a second positive electrode material coating layer containing second positive electrode material particles and a conductive material, and
an average particle diameter of the first positive electrode material particles is greater than an average particle diameter of the second positive electrode material particles.

8. The secondary battery of claim 1, wherein the positive electrodes of the central cells comprise a first positive electrode material coating layer containing first positive electrode material particles and a conductive material,
the positive electrodes of the side cells comprise a second positive electrode material coating layer containing second positive electrode material particles and a conductive material, and
the second positive electrode material coating layer contains more conductive material than the first positive electrode material coating layer.

9. The secondary battery of claim 1, wherein the central cells comprise a positive electrode, a negative electrode, and a first separator with porosity interposed therebetween,
the side cells comprise a positive electrode, a negative electrode, and a second separator with porosity interposed therebetween,
and a resistance of the second separator is lower than that of the first separator.

10. The secondary battery of claim 1, wherein the outermost electrode is a negative electrode disposed at the outermost of the central cells.

11. The secondary battery of claim 1, wherein the outermost electrode is a positive electrode disposed at the outermost of the central cells.

12. The secondary battery of claim 1, wherein the package is a pouch package.

* * * * *